Nov. 11, 1969  H. M. WYATT  3,477,535
ROLLER ATTACHMENT FOR A SELF-PROPELLED VEHICLE
Filed March 10, 1967  2 Sheets-Sheet 1

INVENTOR
HAROLD M. WYATT
BY
ATTORNEYS

Nov. 11, 1969　　　　H. M. WYATT　　　　3,477,535
ROLLER ATTACHMENT FOR A SELF-PROPELLED VEHICLE
Filed March 10, 1967　　　　　　　　　　2 Sheets-Sheet 2

INVENTOR
HAROLD M. WYATT
BY
ATTORNEYS

United States Patent Office 3,477,535
Patented Nov. 11, 1969

3,477,535
ROLLER ATTACHMENT FOR A SELF-
PROPELLED VEHICLE
Harold M. Wyatt, Hudson, Iowa, assignor, by mesne assignments, to J. I. Case Company, Racine, Wis., a corporation of Wisconsin
Filed Mar. 10, 1967, Ser. No. 622,354
Int. Cl. B60b 19/12; E01c 19/26
U.S. Cl. 180—20                                    5 Claims

ABSTRACT OF THE DISCLOSURE

A roller attachment for a self-propelled vehicle, said loader including a frame means having a pair of wheels rotatably mounted at opposite sides thereof, a boom means pivotally mounted on the frame means, a first roller means pivotally secured to said boom means, a second roller means pivotally secured to the frame means at the rearward end thereof.

---

Rollers are commonly used in various fields of construction and generally consist of at least one roller member rotatably mounted on a vehicle as an integral part thereof. These rollers are designed only for rolling and as such are used to roll or pack dirt, asphalt, sand, etc. These rollers are usually quite large and cumbersome and are not suited for any purpose other than rolling.

Therefore, it is a principal object of this invention to provide a roller attachment for a self-propelled vehicle.

A further object of this invention is to provide a roller attachment for a self-propelled vehicle which is quickly and easily secured to or removed from the vehicle.

A further object of this invention is to provide a roller attachment for a self-propelled vehicle of the loader type.

A further object of this invention is to provide a roller attachment for a self-propelled vehicle wherein the roller attachment may be lowered with respect to the vehicle thereby causing the vehicle to be elevated from the ground and thereby causing the weight of the vehicle to be placed on the rollers.

A further object of this invention is to provide a roller attachment for a self-propelled vehicle which is hydraulically operated.

A further object of this invention is to provide a roller attachment for a compact, self-propelled vehicle.

A further object of this invention is to provide a roller attachment for a self-propelled vehicle which is durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
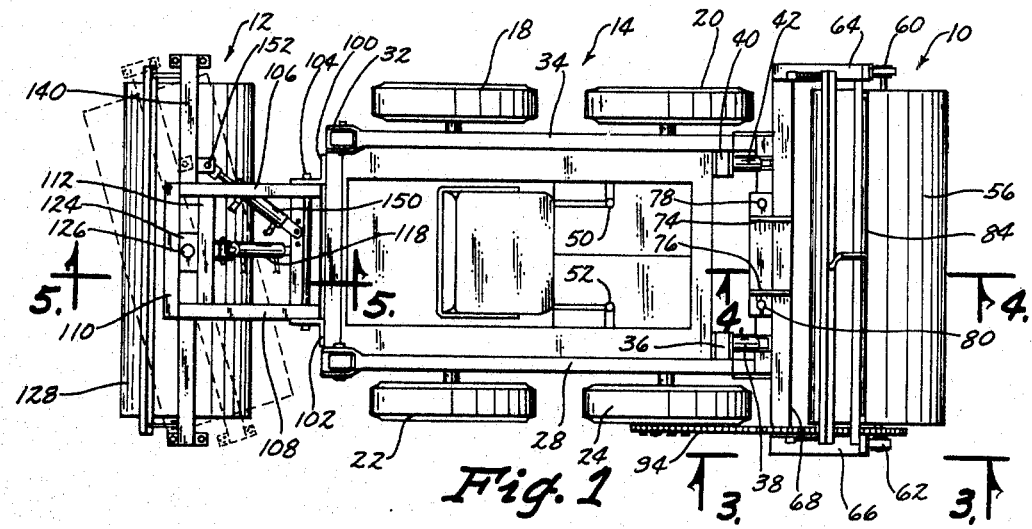
FIG. 1 is a top view of the roller attachment secured to a self-propelled vehicle, the broken lines illustrating one of the positions to which the rear roller member may be pivoted with respect to the vehicle.

The roller attachment of this invention is comprised of a front roller means 10 and a rear roller means 12 which are adapted to be detachably secured to the front and rear ends of a self-propelled vehicle 14. Vehicle 14 is a self-propelled vehicle of the four-wheel drive type having a frame means 16 having a pair of wheels 18, 20 mounted at one side thereof and a pair of wheels 22, 24 mounted at the other side thereof. Each pair of wheels may be selectively rotated in forwardly or rearwardly directions to propel and steer the vehicle. Vehicle 14 is of type manufactured by Universal Manufacturing Company, Hudson, Iowa under the name Uni-Loader. This vehicle is more specifically described in application, Ser. No. 468,684, now U.S. Patent No. 3,319,817.

Figure 2:
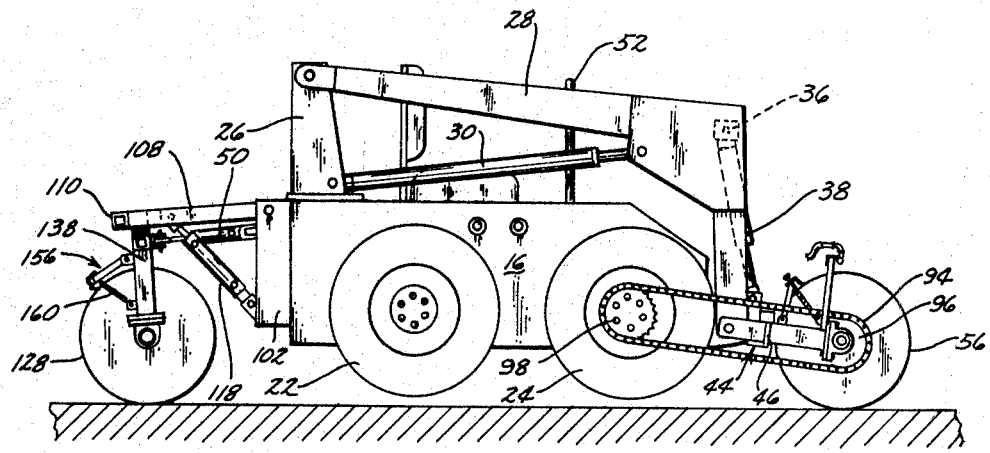
FIG. 2 is a side view of the device illustrating the relationship of the vehicle with respect to the roller elements when the hydraulic power means has been activated to cause the vehicle to be raised from the ground.

Secured to the upper rearward end of vehicle 14 adjacent one side thereof is a boom upright 26 having a boom 28 pivotally secured thereto as seen in FIGS. 1 and 2. A hydraulic lift cylinder 30 is pivotally connected at its base end to the lower forward end of upright 26 and at its other end to boom 28 as seen in FIG. 2. Secured to the upper rearward end of loader 14 adjacent its other side is a boom upright 32 having a boom 34 pivotally secured thereto as seen in FIG. 1. A hydraulic lift cylinder (not shown) is pivotally connected at its base end to the lower forward end of upright 32 and at its other end to boom 34 in identical fashion as lift cylinder 30 is secured to upright 26 and boom 28. A bracket 36 is secured to boom 28 adjacent the forward end thereof and a tilt cylinder 38 is pivotally secured thereto and extends downwardly therefrom. A bracket 40 is secured to boom 34 adjacent the forward end thereof as seen in FIG. 1 and a tilt cylinder 42 is pivotally secured thereto and extends downwardly therefrom. A cross member means 44 is pivotally secured to and extends between the forward ends of booms 28 and 34 and is also pivotally secured to the lower ends of tilt cylinders 38 and 42. Cross member means 44 consists of an elongated angle 46 having a pair of spaced apart ear members secured thereto and extending rearwardly therefrom, each pair of ears receiving the forward end of one of the booms 28 and 34. Cross member means 44 also includes an upper plate member 48 which is secured to the upper end of elongated angle 46 and extends rearwardly therefrom. Each of plates 48 and elongated angle 46 are provided with registering openings formed therein adapted to receive a pin means extending therethrough to effect the detachable connection of various equipment to the cross member means 44. Vehicle 14 is provided with a conventional power means which supplies power for propelling the vehicle and which also supplies power to the hydraulic system of the vehicle. Vehicle 14 is provided with a pair of control levers 50 and 52 which are adapted to propel and steer the vehicle as well as controlling the operation of the booms 28, 34 and the pivotal movement of the cross member means 44 with respect thereto. The hydraulic system of the vehicle may be selectively actuated to cause booms 28 and 34 to be raised or lowered with respect to the vehicle and may also be selectively actuated to cause the pivotal movement of the cross member means 44 with respect to the booms 28 and 34.

Figure 4:
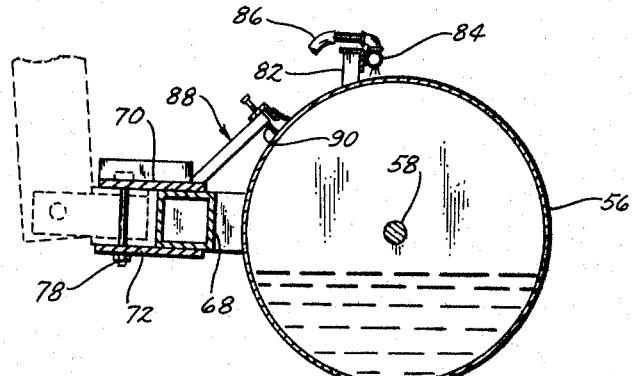
FIG. 4 is an enlarged sectional view as would be seen on line 4—4 of FIG. 1.

Front roller means 10 is detachably connected to the cross member means 44 as will be described in more detail hereafter. Roller means 10 includes an elongated hollow roller 56 which is adapted to contain a fluid therein to provide additional weight thereto. Roller 56 has a central shaft 58 extending therethrough and which protrudes from the opposite ends thereof. The protruding ends of shaft 58 are journaled in bearing means 60 and 62 which are secured to the forward ends of braces 64 and 66 respectively. Braces 64 and 66 extend rearwardly from bearings 60 and 62 and have a beam 68 extending between the rearward ends thereof. A pair of spaced apart plates 70 and 72 are welded to the upper and lower surfaces of beam 68 intermediate the length thereof and extend rearwardly therefrom as best seen in FIG. 4. A pair of reinforcing plates 74 and 76 are welded to and extend between beam 68 and plate 70 as best illustrated in FIGS. 1 and 4. Plates 70 and 72 are spaced apart so as to receive cross member beams 44 therebetween. Plates 70 and 72 are provided with registering openings formed therein which are adapted to receive the pin means 78 extending therethrough and through the plate 48 and angle 46 to effect the detachable connection of the front roller means 10 to the cross member means 44.

Figure 3:
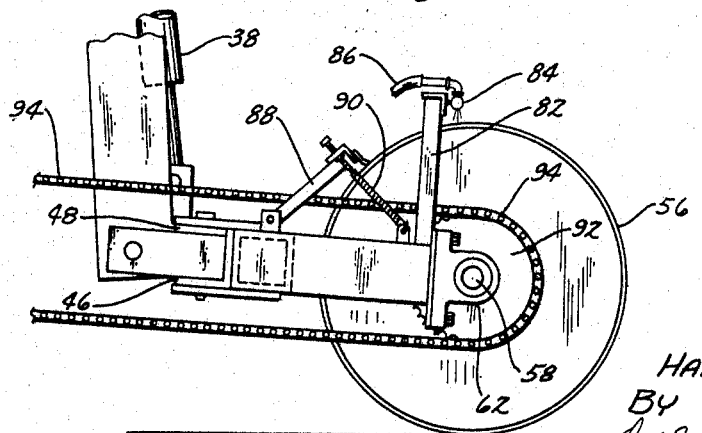
FIG. 3 is an enlarged view as would be seen on line 3—3 of FIG. 1.

Front roller means 10 is also provided with a support member 82 which is secured to braces 64 and 66 and extends over the upper portion of roller 56. An elongated sprinkler pipe 84 is secured to support 82 as illustrated in FIG. 3 and is operatively connected to a source of water on the vehicle by means of line 86. A scraper means 88 is pivotally connected at its opposite ends to braces 64 and 66 and is adapted to engage the surface of roller 56 to scrape undesirable material therefrom. Each of the opposite ends of scraper 88 are provided with an adjustable spring means 90 secured thereto which is adapted to yieldably maintain the scraper 88 in engagement with the exterior surface of roller 56 as best illustrated in FIG. 3. A sprocket 92 is secured to one end of the roller 56 by any convenient means such as welding or bolts, and is adapted to receive a chain 94 extending therearound. Wheel 24 of vehicle 14 is also provided with a sprocket 96 secured thereto by bolts 98 and is adapted to receive the chain 94 extending therearound. Thus, any driving rotation supplied to wheel 24 will be transmitted to the roller 56 by the chain 94.

A pair of vertically disposed, spaced apart angles 100 and 102 are secured to the rearward end of vehicle 14 by any convenient means such as by bolts or the like. A rod 104 is rotatably mounted in and extends between the upper ends of angles 100 and 102. A pair of spaced apart arm members 106 and 108 are pivotally mounted on rod 104 between angles 100 and 102 and extend rearwardly therefrom as best seen in FIG. 1. A cross brace 110 is secured to the rearward ends of arm members 106 and 108 and extends therebetween. A cross brace 112 is secured to arm members 106 and 108 forwardly of cross brace 110 and extends therebetween as best seen in FIG. 1. A plate member 114 is secured to the lower ends of angles 100 and 102 and extends therebetween and has a bracket 116 secured thereto and extending upwardly and rearwardly therefrom. A hydraulic cylinder 118 is pivotally secured at its base end to bracket 116 by means of a pin 120 and is fluidly connected to the vehicle hydraulic system. A bracket 122 is secured to the forward side of cross brace 112 and pivotally receives the rod end of cylinder 118. Cylinder 118 is of the double acting type and is operatively connected to the vehicle hydraulic system to control the retraction and extension of the piston rod thereof.

Figure 5:
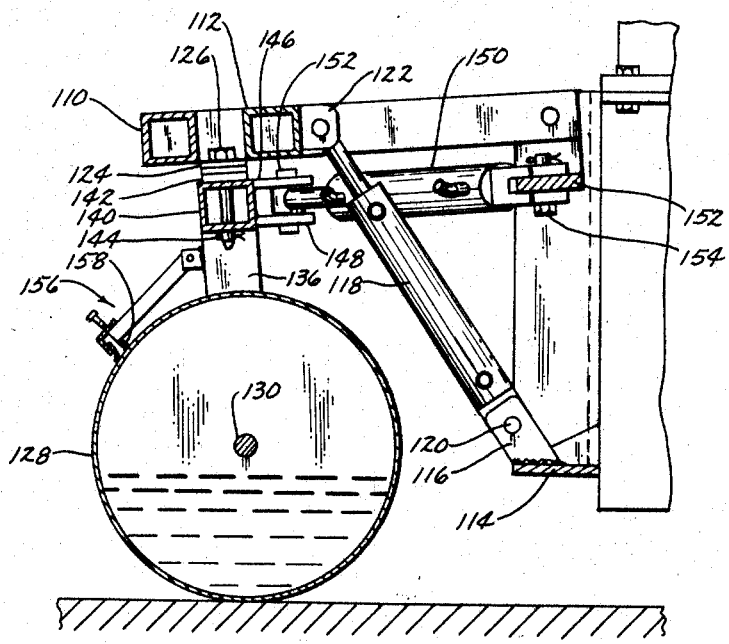
FIG. 5 is an enlarged sectional view as would be seen on line 5—5 of FIG. 1.

A pivot plate 124 is welded to cross braces 110 and 112 and is adapted to have a pivot pin 126 rotatably extending downwardly therethrough. The numeral 128 designates a hollow roller having an axle 130 extending therethrough and protruding from opposite ends thereof. The protruding end portions of axle 130 are mounted in bearings 132 and 134 respectively which are secured to upstanding supports 136 and 138 respectively. A beam 140 is secured to the upper end of supports 136 and 138 and extends therebetween over the top of roller 128. A plate 142 is secured to beam 140 and engages pivot plate 124 immediately thereabove. As seen in FIG. 5, pin 126 extends downwardly through plate 124, plate 142 and beam 140 and is maintained therein by a key 144. A pair of ears 146 and 148 are secured to beam 140 outwardly of arm member 106 and extends forwardly therefrom as seen in FIGS. 1 and 5. The rod end of a hydraulic cylinder 150 is pivotally secured between ears 146 and 148 by a pin 152. The base end of cylinder 150 is pivotally secured by pin 154 to a bar 152 which is secured at its ends to the forward ends of arm members 106 and 108. Cylinder 150 is of the double acting type and is operatively connected to the vehicle hydraulic system. A scraper means 156 is pivotally secured at its opposite ends to supports 136 and 138 and extends downwardly over roller 128 as seen in FIGS. 1 and 5. Scraper means 156 is yieldably urged into scraping engagement with the exterior surface of roller 128 by an adjustable spring means 158 and 160 at opposite ends thereof.

In operation, the front roller means 10 may be quickly attached to cross member means 44 by pins 78 and 80. Chain 94 would then also be extended over sprockets 92 and 96. The rear roller means 12 is also quickly attached to the rearward end of the vehicle by causing rod 104 and pin 120 to be installed in their proper positions. Hydraulic cylinders 118 and 150 would then be operatively connected to the vehicle hydraulic system. Thus, the front roller means 10 and the rear roller means 12 are quickly and easily attached to the vehicle and may be detached therefrom by employing a procedure reverse to that described above.

Figure 6:
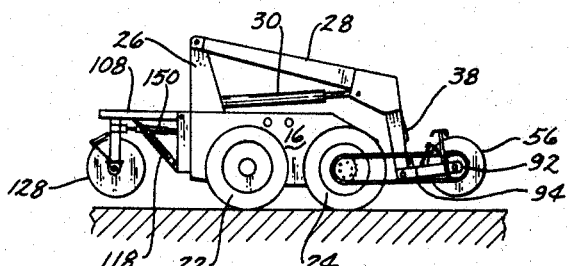
FIG. 6 is a side view illustrating the relationship of the roller elements and the vehicle when the roller elements have been raised from the ground.

It can be appreciated that the booms 28 and 34 may be raised with respect to the frame means 16 to cause roller 56 and the structure associated therewith to be raised with respect to the ground. Roller 128 may also be raised with respect to the ground by causing cylinder 118 to be extended thereby causing roller 128, supports 136, 138, cross braces 110 and 112, and arm members 106 and 108 to be pivoted about rod 104. Thus, rollers 56 and 128 may be raised to the position seen in FIG. 6 to permit the vehicle to be moved from one location to another without the rollers engaging the ground surface. If desired, chain 94 could be removed from its sprockets during times of transit thereby permitting the vehicle to operate at a much greater road speed.

In operation, booms 28 and 34 are lowered with respect to the frame means 16 and roller 56 and its associated structure is pivoted downwardly with respect to the forward ends of the booms 28 and 34 by means of the tilt cylinders thereby causing cross member means 44 and hence the roller means 10 to the pivoted in a clockwise direction as viewed in FIG. 2. Roller 56 may be moved with respect to the frame means 16 until the front wheels 20 and 24 of the vehicle are raised from the ground as seen in FIG. 2 to cause the weight of the vehicle to be transferred to the roller 56.

The rear roller means 12 may be lowered with respect to the vehicle by simply causing cylinder 118 to retract its piston rod thereby causing roller 128 to be moved to the position seen in FIG. 2 whereby the rear wheels 18 and 22 of the vehicle are raised from the ground thereby causing the weight of the vehicle to be transmitted to the roller 128. Thus, the vehicle may be propelled by simply causing wheel 24 to be driven in a forwardly or rearwardly direction which will cause the rotation of roller 56 due to the chain connection between wheel 24 and roller 56. If desired, the wheels of the vehicle could also be left on the ground to lightly engage the same to provide driving power to the device which would eliminate the necessity of the chain 94.

When the wheels of the vehicle are elevated from the ground as seen in FIG. 2, the vehicle may be steered by controlling the operation of cylinder 150. As seen in FIG. 1, the extension of the piston rod of cylinder 150 will cause roller 128 to be pivoted to the position as illustrated by broken lines. Obviously, the retraction of the piston rod of cylinder 150 will cause the roller 128 to be pivoted to a position opposite of that shown by broken lines in FIG. 1.

It can therefore be seen that a roller attachment has been provided for a self-propelled vehicle which is quickly attachable to and detachable from vehicle. The vehicle and its roller attachments is a compact machine and has the ability to operate in narrow confines. The pivotal movement of the rollers 56 and 128 provides a great deal of maneuverability and versatility to the device. It can also be appreciated that the vehicle 14 can also be used for a variety of other purposes when the front roller means 10 and rear roller means 12 have been removed therefrom.

Thus, it can be seen that the device accomplishes at least all of its stated objectives.

I claim:
1. In combination,
    a self-propelled vehicle having rearward and forward ends, a boom means pivotally secured at one end to said vehicle and a pair of driven wheels at each side of said vehicle, said pair of wheels at each side of said vehicle being selectively driven in rearwardly or forwardly directions to propel and steer the vehicle,
    a first roller means selectively pivotally and rotatably secured to said boom means at the other end thereof and being positioned at the forward end of said vehicle, and
    a second roller means pivotally and rotatably secured to said vehicle at the rearward end thereof,
    said first roller means being pivotally secured to said boom means about a horizontal axis whereby said first roller means may be raised and lowered with respect to said other end of said boom means and said vehicle,
    said second roller means being pivotally secured to said vehicle about a horizontal axis whereby said first roller means may be raised and lowered with respect to said other end of said boom means and said vehicle,
    said second roller means being pivotally secured to said vehicle about a horizontal axis whereby said second roller means may be raised and lowered with respect to said vehicle,
    said second roller means being also operatively pivotally secured to said vehicle about a vertical axis whereby said second roller means may be pivoted about said vertical axis at times to steer said vehicle,
    said boom means including first and second boom arms pivotally connected at their rearward ends to said vehicle, said boom arms having a cross member means pivotally secured to their other ends and extending therebetween, said boom arms having a hydraulic cylinder means secured thereto for raising and lowering said boom arms with respect to said vehicle, said cross member means having a hydraulic tilt cylinder means secured thereto adapted to pivot said cross member means with respect to said boom arms, said first roller means operatively detachably connected to said cross member means, said front roller means including an elongated hollow roller having a horizontal shaft means extending from opposite ends thereof, each of said shaft means being operatively rotatably secured to a brace means extending rearwardly towards said vehicle, a beam secured to and extending between the rearward ends of said braces, said beam having a pair of spaced apart plates secured thereto intermediate its length and extending rearwardly therefrom, said plates adapted to receive said cross member means therebetween, and a pin means extending through said plates and said cross member means adapted to detachably interconnect same, said second roller means including a first frame means pivotally secured at one end about a horizontal axis to said vehicle and extending rearwardly therefrom, a second frame means pivotally secured about a vertical axis to said first frame means and extending downwardly therefrom, a roller rotatably secured to said second frame means, a first power means secured to said first frame means adapted to pivot said first frame means at times to raise and lower said roller, a second power means secured to said second frame means adapted to pivot said second frame means and said roller with respect to said first frame means and said vehicle at times to steer said vehicle.

2. In combination,
    a self-propelled vehicle having rearward and forward ends and a pair of driven wheels at each side of said vehicle, said pair of wheels at each side of said vehicle being selectively driven in rearwardly or forwardly directions to propel and steer the vehicle,
    first and second boom arms having rearward and forward ends and being pivotally connected at their rearward ends to said vehicle at the rearward end thereof and extending forwardly therefrom over said vehicle to a position forwardly of said vehicle,
    a first roller means selectively pivotally and rotatably secured to the forward ends of said boom arms and being positioned at the forward end of said vehicle, and
    a second roller means pivotally and rotatably secured to said vehicle at the rearward end thereof,
    said first roller means being pivotally secured to said boom arms about a horizontal axis whereby said first roller means may be raised and lowered with respect to said forward end of said boom arms and said vehicle,
    said second roller means being pivotally secured to said vehicle about a horizontal axis whereby said second roller means may be raised and lowered with respect to said vehicle,
    said second roller means being also operatively pivotally secured to said vehicle about a vertical axis whereby said second roller means may be pivoted about said vertical axis at times to steer said vehicle.

3. The combination of claim 2 wherein said second roller means includes a first frame means pivotally secured at one end about a horizontal axis to said vehicle and extends rearwardly therefrom, a second frame means pivotally secured about a vertical axis to said first frame means and extending downwardly therefrom, a roller rotatably secured to said second frame means, a first power means secured to said first frame means adapted to pivot said first frame means at times to raise and lower said roller, a second power means secured to said second frame means adapted to pivot said second frame means and said roller with respect to said first frame means and said vehicle at times to steer said vehicle, said first power means being comprised of a hydraulic cylinder extending between the rearward end of said vehicle and said first frame means, said second power means being comprised of a hydraulic cylinder extending between said first and second frame means.

4. The combination of claim 2 wherein said first roller means includes a first roller, said first roller having a first sprocket at one end thereof, a second sprocket secured to one of the driven wheels of said vehicle, and a chain extending around and between said sprockets whereby driving rotation of said one driven wheel will cause said first roller to be rotated.

5. The combination of claim 2 wherein one of said wheels is operatively connected to said first roller means so that the rotation of said wheel will cause the rotation of said first roller means to propell the vehicle.

References Cited

UNITED STATES PATENTS

| | | | |
|---|---|---|---|
| 1,458,751 | 6/1923 | Gailor | 180—20 |
| 2,830,511 | 4/1958 | Wills et al. | 94—50 |
| 3,319,817 | 5/1967 | Juhl et al. | 180—77 XR |

LEO FRIAGLIA, Primary Examiner

J. A. PEKAR, Assistant Examiner

U.S. Cl. X.R.

94—50